(12) United States Patent
Dolinar et al.

(10) Patent No.: US 7,433,954 B2
(45) Date of Patent: *Oct. 7, 2008

(54) PROVIDING TELEPHONY SERVICES IN A COMMUNICATIONS NETWORK

(75) Inventors: Larry Dolinar, Richardson, TX (US); Michel Kallas, Allen, TX (US); Jinchi Chu, Plano, TX (US)

(73) Assignee: Nortel Networks Limited, St. Laurent, Quebec (CA)

( * ) Notice: Subject to any disclaimer, the term of this patent is extended or adjusted under 35 U.S.C. 154(b) by 679 days.

This patent is subject to a terminal disclaimer.

(21) Appl. No.: 10/927,643

(22) Filed: Aug. 26, 2004

(65) Prior Publication Data

US 2005/0080905 A1    Apr. 14, 2005

Related U.S. Application Data

(63) Continuation of application No. 09/588,929, filed on Jun. 7, 2000, now abandoned, and a continuation-in-part of application No. 09/436,562, filed on Nov. 9, 1999, now Pat. No. 6,701,366.

(60) Provisional application No. 60/168,846, filed on Dec. 3, 1999.

(51) Int. Cl.
*G06F 15/16* (2006.01)
*G06F 15/173* (2006.01)

(52) U.S. Cl. .................... 709/226; 709/223; 379/201.04

(58) Field of Classification Search ................. 709/226, 709/223; 379/201.01–201.12
See application file for complete search history.

(56) References Cited

U.S. PATENT DOCUMENTS 5,528,677 A    6/1996    Butler et al.

FOREIGN PATENT DOCUMENTS

| WO | WO 94/05111 | 3/1994 |
|---|---|---|
| WO | WO 99/20058 | 4/1999 |

OTHER PUBLICATIONS

Information Sciences Institute, "Internet Protocol, DARPA Internet Program Protocol Specification," pp. 1-45, Request for Comments 791, Sep. 1981.

(Continued)

*Primary Examiner*—Larry D Donaghue
(74) *Attorney, Agent, or Firm*—Trop, Pruner & Hu, P.C.

(57) ABSTRACT

A communications network includes packet-based networks that are coupled to various network elements. A method and apparatus is provided to implement telephony services in the communications network. The architecture for providing the telephony services may include several layers, including a network elements layer, an interface layer, and a services/application layer. The services/application layer is decoupled from the specific implementations of the network element layer so that a more flexible and convenient mechanism is provided to create telephony services. The telephony services may be implemented in software modules written in one of several possible languages, such as a telephony scripting language (TSL) or other language. The interface layer includes various components, including translation components to interpret and execute the modules that are in the services/application layer, communications components to provide mechanisms to send commands to network elements layer to perform the specified telephony services, and representation components that describe the functions, tasks, and other details associated with network elements.

37 Claims, 9 Drawing Sheets

OTHER PUBLICATIONS

Innosoft International, Inc., "Lightweight Directory Access Protocol (Version 3) Specifications," http://www3.innosoft.com/ldapworld/ldapv3.html, pp. 1-3, Dec. 1998.

Lennox/Schulzrinne, "CPL: A Language for User Control of Internet Telephony Services," pp. 1-22, Feb. 26, 1999.

W3C XML Working Group, "Extensible Markup Language (XML) 1.0, W3C Recommendation Feb. 10, 1998," pp. 1-32, Feb. 1998.

Deering, S. et al. "Internet Protocol, Version 6 (IPv6) Specification," Request for Comments 2460, printed from http://www.ietf.org website, pp. 1-36, Dec. 1998.

Handley, M. et al. "SIP: Session Initiation Protocol," Request for Comments 2543, printed from http://www.ietf.org website, pp. 1-153, Mar. 1999.

Electronic Privacy Information Center, "The Cookies Page," printed from http://www.epic.org/privacy/internet/cookies/, Nov. 1999, pp. 1-2.

U.S. Department of Energy, CIAC, "I-034: Internet Cookies," printed from http://ciac.llnl.gov/ciac/bulletins/I-034.shtml, Mar. 1998, pp. 1-6.

Netscape, "Persistent Client State HTTP Cookies," printed from http://home.netscape.com/newsref/std/cookie_spec.html, Nov. 1999, pp. 1-5.

D. Box et al., HTTP Working Group, Internet Draft, "SOAP: Simple Object Access Protocol", Sep. 1999, pp. 1-22.

Object Management Group, Inc., "What is CORBA?", printed from wysiwyg://78/http://www.omg.org/corba/whatiscorba.html, 1997-2000.

Washington University in St. Louis, Department of Computer Science, "Overview of CORBA", printed from http://www.cs.wustl.edu/~schmidt/corba-overview.html, Mar. 13, 2000.

Object Management Group, Inc., "CORBA Overview", printed from http://www.www.infosys.tuwien.ac.at/Research/Corba/OMG/arch2.html, 1995.

P.T. Taylor, Media Gateway Control, Internet Draft, "Megaco Errata", May 2000, pp. 1-19.

"CORBA Overview", Structure of an Adapter, CORBA V.2.3, Jun. 1999, pp. 2-1 through 2-18.

PROVIDING TELEPHONY SERVICES IN A COMMUNICATIONS NETWORK

This is a continuation of U.S. Ser. No. 09/588,929, filed Jun. 7, 2000 now abandoned, which claims the benefit, pursuant to 35 U.S.C. § 119(e), of U.S. Provisional Application Ser. No. 60/168,846, entitled "Providing Telephony Services in a Communications Network," filed on Dec. 3, 1999. U.S. Ser. No. 09/588,929 is also a continuation-in-part of U.S. patent application Ser. No. 09/436,562, entitled "Providing Communications Services," filed on Nov. 9, 1999, now U.S. Pat. No. 6,701,366. Each of the referenced applications is hereby incorporated by reference.

BACKGROUND

The invention relates to providing telephony services in communications networks.

Data networks are widely used to link various types of nodes, such as personal computers, servers, gateways, network telephones, and so forth. Networks may include private networks, such as local area networks and wide area networks, and public networks, such as the Internet. The increased availability of such data networks has improved accessibility among nodes coupled to the data networks. Popular forms of communications across such data networks include electronic mail, file transfer, web browsing, and other exchanges of digital data.

With the increased capacity and reliability of data networks, voice and multimedia communications over data networks have become possible. Such forms of communications include telephone calls over the data networks, video conferencing, and distribution of multimedia data (such as by multicast).

Various standards have been proposed for voice and multimedia communications over data networks. For example, a multimedia data and control architecture has been developed by the Internet Engineering Task Force (IETF). The protocols that are part of the IETF multimedia data and control architecture include a Session Initiation Protocol (SIP) for establishing call sessions; a Resource Reservation Protocol (RSVP) for reserving network resources; a Real-Time Transport Protocol (RTP) for transporting real-time data and providing quality of service (QoS) feedback; a Real-Time Streaming Protocol (RTSP) for controlling delivery of streaming media; a Session Announcement Protocol (SAP) for advertising multimedia sessions by multicast; and a Session Description Protocol (SDP) for describing multimedia sessions.

In a communications system that provides for voice or other streaming communications, various types of telephony or call services may need to be defined to process and respond to call requests. A communications network may include various elements, such as a voice mail system, an integrated voice response (IVR) system, media gateways, and so forth, that may be involved in a given call session. Creation of applications to handle various services that may be part of a call session needs to account for interactions among the network elements.

A need thus exists for a convenient and efficient method and apparatus to provide for telephony services in a communications network.

SUMMARY

In general, according to one embodiment, a method for use in a communications network having network elements for performing telephony services includes providing an interface to the network elements. The interface receives requests from a software module containing elements representative of telephony services to be performed. Commands are sent to one or more network elements involved in performing the desired telephony services.

Some embodiments of the invention may have one or more of the following advantages. A more efficient and convenient method and apparatus of creating or generating telephony services in a communications network is provided. A technique is provided to abstract implementation details of components (in the form of network elements, for example) performing various telephony services from software routines, modules, or scripts created by users to provide for telephony services. Such abstraction allows for a much more efficient mechanism for creating technique services.

Other features and advantages will become apparent from the following description, from the drawings, and from the claims.

DETAILED DESCRIPTION

In the following description, numerous details are set forth to provide an understanding of the present invention. However, it will be understood by those skilled in the art that the present invention may be practiced without these details and that numerous variations or modifications from the described embodiments may be possible.

Figure 1:
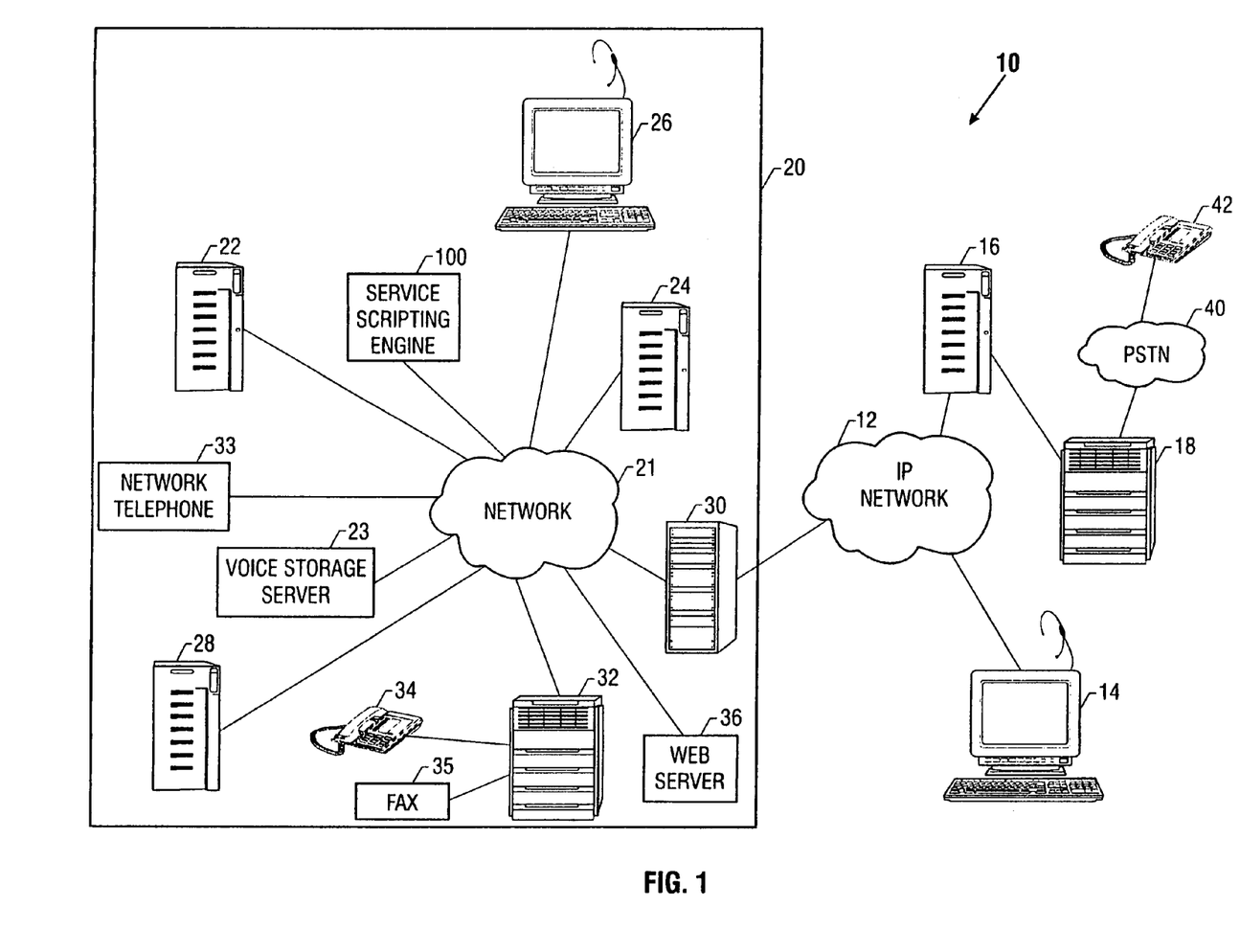
FIG. 1 is a block diagram of an embodiment of a communications system including packet-based data networks.

Referring to FIG. 1, a communications system 10 includes various nodes or network elements that are capable of communicating with each other. The example network elements and the manner in which they are interconnected are for illustrative purposes only, and are not intended to limit the scope of the invention. Many other arrangements and architectures are possible in further embodiments.

The communications system 10 may include a private network 21 that is located in community 20 and a public network 12 (e.g., the Internet). A "community" may refer to any predetermined group of elements or users that are connected through a network. A "private network" refers to a network that is protected against unauthorized general public access. A "network" may refer to one or more communications networks, links, channels, or paths, as well as routers or gateways used to pass data between elements through such networks, links, channels, or paths. Although reference is made to "private" and "public" networks in this description, further embodiments may include networks without such designations. For example, a community may refer to nodes or elements coupled through a public network or a combination of private and public networks.

In one embodiment, the protocol used in the various networks may be the Internet Protocol (IP), as described in Request for Comments (RFC) 791, entitled "Internet Protocol," dated September 1981. Other versions of IP, such as IPv6, or other packet-based standards may also be utilized in further embodiments. A version of IPv6 is described in RFC 2460, entitled "Internet Protocol, Version 6 (IPv6) Specification," dated December 1998. Packet-based networks such as IP networks communicate with packets, datagrams, or other units of data that are sent over the networks. Unlike circuit-switched networks, which provide a dedicated end-to-end connection or physical path for the duration of a call session, a packet-based network is one in which the same path may be shared by several network elements.

A packet-based network may be a packet-switched network, such as an IP network, which is based on a connectionless internetwork layer. Packets or other units of data injected into a packet-switched data network may travel independently over any network (and possibly over different networks) to a destination terminal. The packets may even arrive out of order. Routing of the packets is based on one or more addresses carried in each packet. Other types of packet-based networks include connection-oriented networks, such as Asynchronous Transfer Mode (ATM) networks or Frame Relay, which are based on a virtual circuit model.

The community 20 may include nodes or elements that allow users to participate in audio (e.g., voice) and multimedia (e.g., audio and video) communications sessions. Examples of such communications sessions include telephone calls, video conferencing, and other sessions in which streaming data is exchanged. In this description, such communications sessions are referred to as telephony or call sessions. Various telephony or call services may be performed in a telephony session. For example, an announcement may be played, a message may be recorded, a tone may be played, detection for a dual tone multi-frequency (DTMF) signal may be performed, a call can be forwarded from one terminal to another terminal, a recorded voice message may be retrieved, and so forth. A "telephony service" may be defined as any action or service associated with a telephony or call session.

A "telephony session" or "call session" refers generally to either an audio (e.g., voice), a multimedia session, or any other type of session in which streaming data is exchanged between two or more network elements or terminals coupled to a data network. An "interactive" telephony or call session refers to a telephony or call session in which two or more parties are involved in an exchange of audio and/or video data in an established session between two or more network elements. A "real-time" interactive telephony or call session refers to an exchange of data on a substantially real-time basis between two terminals. A session is substantially real-time if interaction is occurring between two end points or parties, with a communication from one end point followed relatively quickly by a response or another communication from the other end point, typically within seconds, for example.

Interactive call sessions are contrasted with electronic mail messaging, for example, in which a first participant sends a message over a data network to a second participant, with no acknowledgment indication usually provided back to the first participant that the second participant has received or that the second participant is even at his or her terminal. In contrast, an interactive session involves a request followed by some acknowledgment that a called party has answered the call request to enable the interactive session to be established in which participants exchange data (e.g., voice, video, and/or text). The terms "telephony session" and "call session" are used interchangeably herein.

In accordance with some embodiments, an architecture or framework for the creation of telephony services and applications for telephony sessions over packet-based networks, such as an IP network, includes a lower layer including network elements for performing telephony services, an upper layer including software modules in which telephony services are represented, and an interface layer (or middleware layer) between the upper and lower layers. The interface layer may be used to abstract the functionality of the network elements that are part of the communications system 10. This allows a convenient technique for creating software modules to provide telephony services since a software developer can create code or scripts to provide for telephony services without having to worry about the implementation details (location of device, programming language, etc.) of devices that are actually performing a requested service. In the architecture or framework according to some embodiments, a common interface layer is provided between multiple services in the upper layer (software modules) and multiple network elements in a lower layer.

The presence of the upper layer to provide for telephony services extends features available in network elements beyond simple call services to include call forwarding, conferencing, transfer, and other telephony services users may desire. Each software module includes elements that are representative of various telephony services to be performed. Such elements may be sub-routines, methods, objects, or any other element that may be user-created. For example, the software module may be generally represented as state diagrams with customizable flow paths and properties. Each state may be associated with a telephony action or service, and a trigger causing a transition between states may be a user input or status of a current telephony session.

Examples of communications devices that are capable of participating in telephony sessions over the network 21 include conventional telephones 34 and fax machines 35 that are coupled to a media gateway 32. The media gateway 32 connects non-network terminals, such as the telephones 34 and fax machine 35, to the network 21. The media gateway 32 may work in conjunction with a media gateway controller 28 to route data between the network 21 and the terminals coupled to the media gateway 32. Although shown as separate components, the media gateway 32 and media gateway controller 28 may be implemented in the same platform. The media gateway controller 28 controls individual tasks and resources of the media gateway 32. In addition, the media gateway controller 28 controls communications to the terminals coupled to the media gateway 32.

The community 20 may also include network telephones 33, which are telephones with network interface units to enable communications over the network 21. Other communications devices include computers 26 that have voice and/or image processing capabilities. A user on one of the communications devices may call a user on another communications device, with voice and/or video data carried through the network 21. The network 21 may be connected to elements outside the community 20 through a gateway system 30.

A call server 24 may also be coupled to the network 21 to manage the establishment, management, and termination of communications sessions between terminals coupled to the network 21. The call server 24 may be coupled to a database system 22 (which may be located on a separate platform or on the same platform as the call server 24) that includes a subscriber directory and a network directory. Also, policy for incoming and outgoing calls may be managed by the call server 24.

The subscriber directory in the database system 22 stores static and dynamic information about users in the community 20. The call server 24 accesses the subscriber directory to locate and route calls to users. The current location of a user may be changed by registering from a different location. The network directory in the database system 22 holds static and dynamic information about network elements and preferences. The network directory allows the call server 24 to determine the most appropriate network resource or resources to use in its operations.

Other network elements that may be coupled to the network 21 include a web server 36 to provide web pages accessible by users inside and outside of the community 20. Another system in the community 20 may be a voice storage server 23 in which voice data, such as those associated with voice mail, may be stored.

Calls originating from one terminal to another terminal are handled by the call server 24. The call server receives a call, and based on the identifying information in the call (including information identifying the source and destination points), the call server 24 routes the call accordingly. In other cases, a peer-to-peer session may be established between two terminals without going through the call server 24.

The call server 24 may be separated into several components, including a SIP proxy, a service platform, a telephony server, and other elements. The service platform can monitor the network to determine if a telephony service needs to be launched. If so, the service platform can call the script engine to launch the telephony service. The telephony server may be a main program that launches PBX functions as needed.

In one embodiment, the call server 24 and some of the other network elements may perform establishment, management, and termination of telephony sessions in accordance with the multimedia data and control architecture from the Internet Engineering Task Force (IETF). The IETF multimedia data and control architecture includes a suite of protocols, including the Session Initiation Protocol (SIP), as described in RFC 2543, entitled "SIP: Session Initiation Protocol," dated March 1999. SIP may be used to initiate communications sessions as well as to invite members to sessions that may have been advertised by some other mechanism, such as electronic mail, news groups, web pages, and others. SIP allows for the determination of the end system to be used for the telephony session. SIP also allows for a determination of the media and media parameters to be used as well as the determination of the willingness of the called party to engage in telephony communications.

Various entities may be defined by SIP. A client according to SIP is an application program that sends SIP requests, such as to perform call requests. A server according to SIP may be an application program that accepts SIP requests to service calls and to send back responses to SIP requests. A SIP proxy or proxy server may be an intermediary program that acts as both a server and a client for making requests on behalf of other clients.

The IETF multimedia and control architecture also includes the Resource Reservation Protocol (RSVP), as described in RFC 2205, for reserving network resources; the Real-Time Transport Protocol (RTP), as described in RFC 1889, for transporting real-time data and providing quality of service (QoS) feedback; the Real-Time Streaming Protocol (RTSP), as described in RFC 2326, for controlling delivery of streaming media; the Session Announcement Protocol (SAP) for advertising multimedia sessions by multicast; and the Session Description Protocol (SDP), as described in RFC 2327, for describing multimedia sessions.

The protocols described are merely examples of protocols that may be used for communications sessions between network elements. In further embodiments, other types of protocols may be used, such as protocols for communications sessions other than voice or multimedia communications sessions. Another protocol includes the H.323 Recommendation from the International Telecommunication Union (ITU). In this description, a communications system implementing SIP and other related protocols is an example of an environment is which modules in accordance with some embodiments may be used to implement telephony services. However, it is contemplated that in further embodiments, modules may be used to create telephony services that work with other protocols or standards.

The public network 12 may be coupled to various elements, including a terminal 14, which may be a network telephone or a computer having voice and/or image processing capabilities. The network 12 may also be coupled through a media gateway controller 16 to a public switched telephone network (PSTN) gateway 18 that provides the interface between a PSTN 40 and a packet-based data network such as the network 12. The PSTN 40 is connected to wireline telephones 42 as well as to mobile telephones and other mobile unit through wireless networks.

Figure 2:
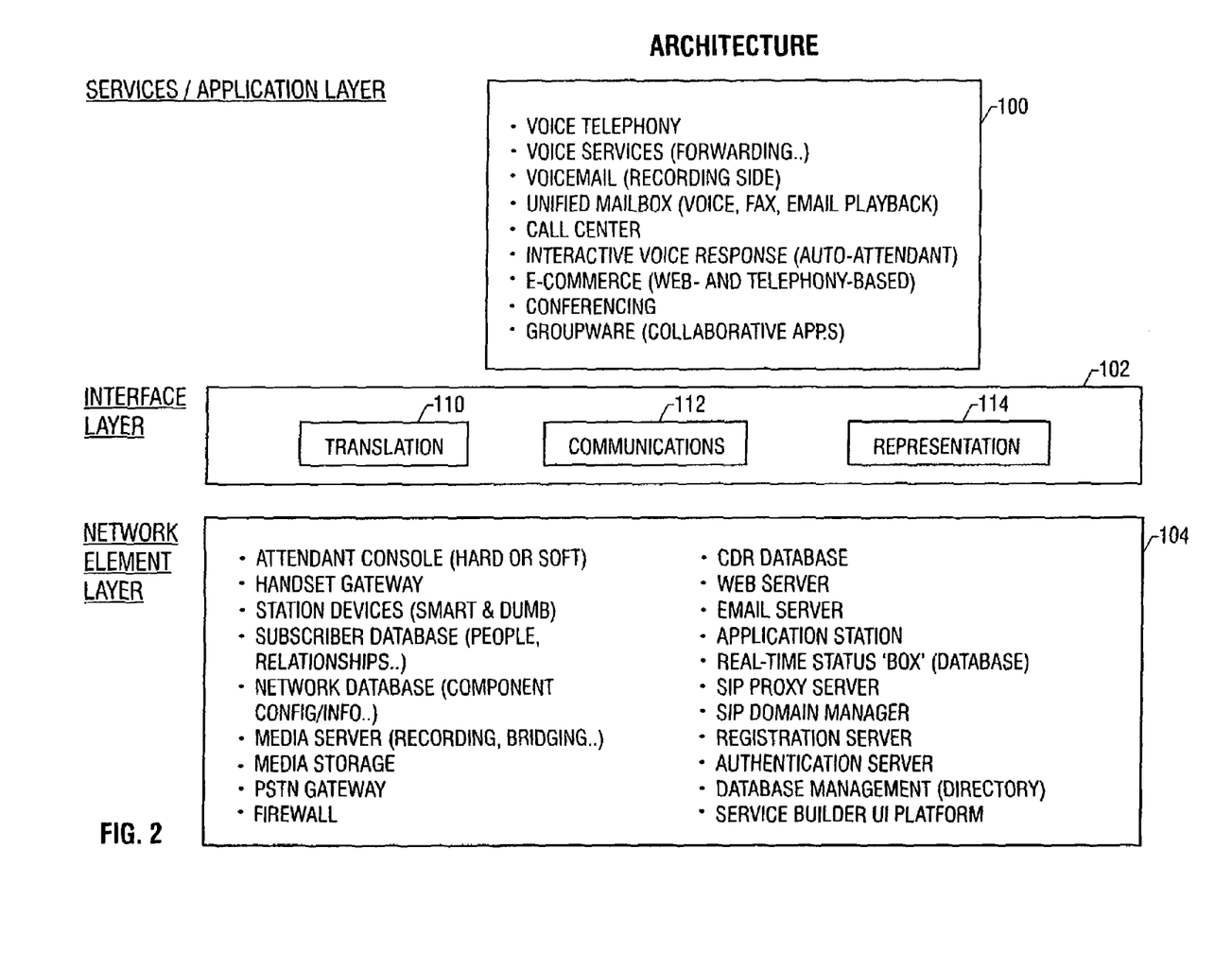
FIG. 2 illustrates layers representing the architecture of a telephony system in accordance with one embodiment.

Referring to FIG. 2, a representation of the architecture or framework in accordance with some embodiments includes three layers: a telephony service or application layer 100, an interface layer 102, and a network elements layer 104. The network elements layer 104 includes various network elements that provide telephony services. Some example network elements include elements shown in FIG. 1 as well as other elements: an attendant console (hard or soft), a hand-set gateway, station devices (smart or dumb), subscriber databases (people, relationships, etc.), network databases (component configuration and information), media server (recording, bridging, etc.), media storage, a PSTN gateway, a firewall system, a CDR database, a web server, an e-mail server, an application station, a real-time status box, a SIP proxy server, a SIP domain manager, a registration server, an authentication server, a database management directory, a server builder user interface (UI) platform, and other elements.

The interface layer 102 includes various components, including translation components 110 to translate, interpret, or compile scripts or code; communications components 112 to enable communications to network elements; and representation components that provide representations or descriptions of the network elements so that the functionality of the network elements may be abstracted at higher levels. The interface layer 102 may be implemented in one or more elements in the network. For example, many of the components may be implemented in a SIP proxy server (such as one implemented in the call server 24).

The translation components 110 may include a script engine (to interpret and execute scripts) and/or compilers or other translators or interpreters. The representation components 114 may include library files that describe the functions, tasks, and other details associated with network elements.

The communications components 112 may include network APIs (application programming interfaces) and procedures to allow mechanisms for network elements to call other network elements, such as the Simple Object Access Protocol (SOAP), as described in an Internet Draft entitled "SOAP:

Simple Object Access Protocol," dated September 1999. The communications components 112 may also include a Common Object Request Broker Architecture (CORBA) component that allows applications to communicate with one another no matter where they are located or who has designed them. CORBA is described in the CORBA/IIOP 2.3.1 Specification, dated Oct. 7, 1999. The communications components 112 may also include Component Object Model (COM) objects.

The services and applications layer 100 may include various software modules that contain elements (in the form of code or scripts) that represent or specify telephony services to be performed. Telephony services may include voice telephony, voice services (e.g., forwarding, etc.), voice mail (recording part), unified mailbox (voice, fax, e-mail playback), call center, integrated voice response (audio-attendant), e-commerce (web and telephony-based), conferencing, and groupware (collaborative applications), as examples.

Figure 3:
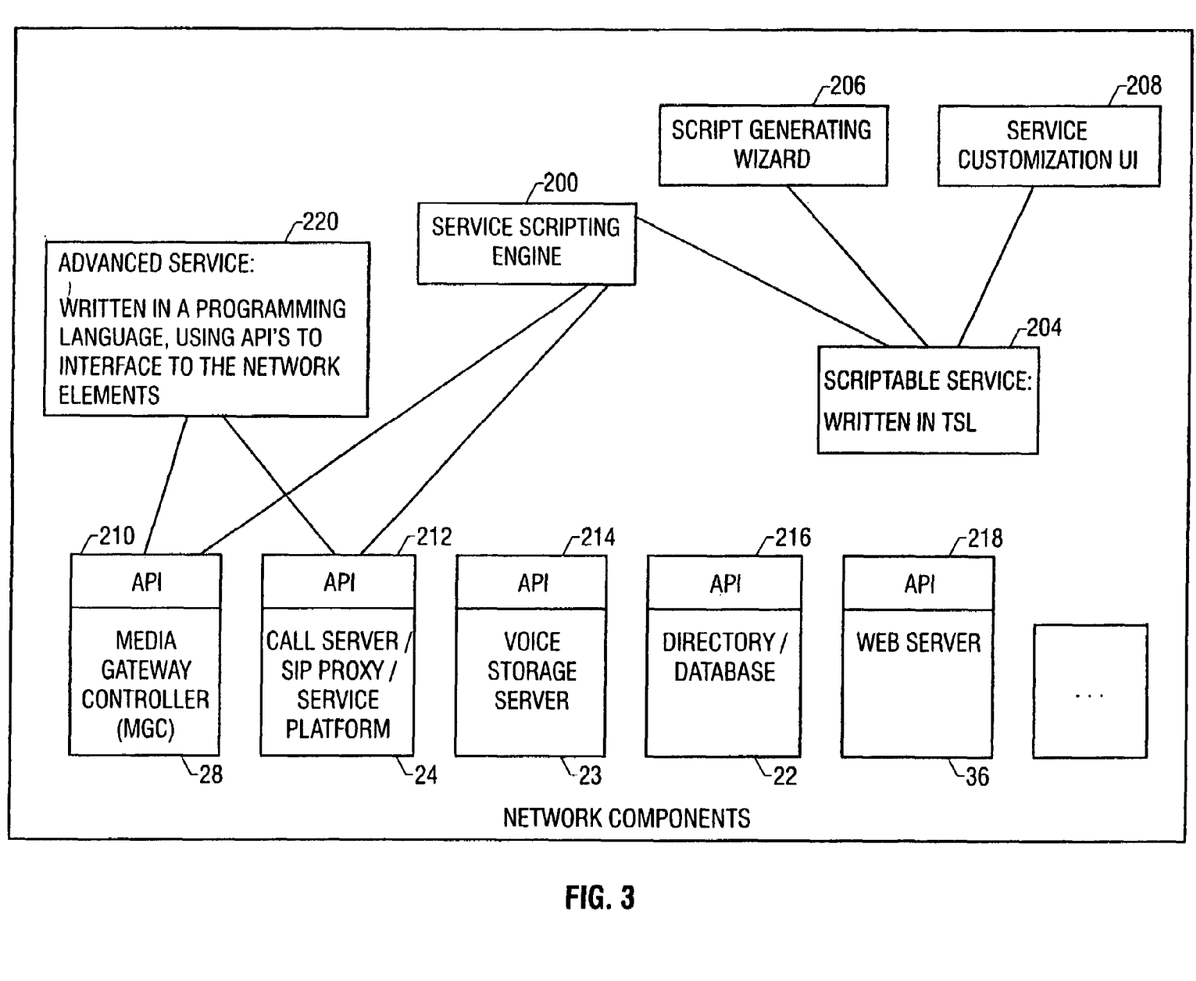
FIG. 3 is a block diagram providing an alternative view of components in the communications system of FIG. 1.

Referring to FIG. 3, a representation of the communications system of FIG. 1 in which APIs are implemented is shown. The elements coupled to the network 21, including the media gateway controller 28, the call server 24, the voice storage server 23, the database system 22, the web server 36, and so forth, may include a corresponding network API 210, 212, 214, 216, and 218, with each defining functions or routines the scripting engine 100 can call to perform actions specified during execution of a script module. Telephony services are implemented as script modules in this embodiment. The called API function or routine is then executed in the respective element to perform the requested action. The API residing in each network element depends on the tasks that are to be performed by that network element. Thus, for example, the call server 24 may include one type of API, while the database system 22 may include another type of API, such as the API defined by the Lightweight Directory Access Protocol (LDAP) Specifications from the IETF. Any type of API may be employed in any given network element, provided that the scripting engine 200 is aware of the API and can make calls to functions or routines in the API.

The script modules 204, residing in one or more storage media accessible by the service scripting engine 200, may be created by a script generating wizard 206 and/or a user interface (UI) 208. In one embodiment, a telephony scripting language (TSL) may be used to generate the script modules. For services that are not implementable by scripts according to TSL, other modules 220 written in a more advanced programming language may be used to implement those services. Such programming languages may include C++, Java, and others.

In accordance with one embodiment, TSL may be a text-based language according to an Extensible Markup Language (XML™), with one version described in "Extensible Markup Language (XML™) 1.0," Worldwide Web Consortium (W3C) Recommendation, dated February 1998. XML™ allows one to define a customized markup language for many classes of documents. XML™ may be used to encode may different types of information, including the script modules as described herein for creating telephony services in accordance with some embodiments.

Each script module may be represented as a state machine including a number of states and triggers that control transitions between different states. In each state or in transitions between states, certain actions corresponding to telephony services may be specified. Triggers are basically test conditions that cause the state machine making up a TSL script module to transition from one state to another. Actions are the tasks that are to be performed, which may be telephony tasks.

As examples, triggers may include the following: a call identifier (to identify the calling party or terminal); a called identifier (to identify the party or terminal being called); a time indicator (to indicate the time of the call); a call progress state indicator (to indicate whether a call is busy, the number of rings that have transpired, whether there is no answer, and so forth); an indicator of detection of DTMF signals; information stored in a remote telephony cookie; an indicator of a database test; an indicator of detection of voice data; and other triggers. Telephony cookies are used to store information about telephony sessions between terminals.

Figure 4:
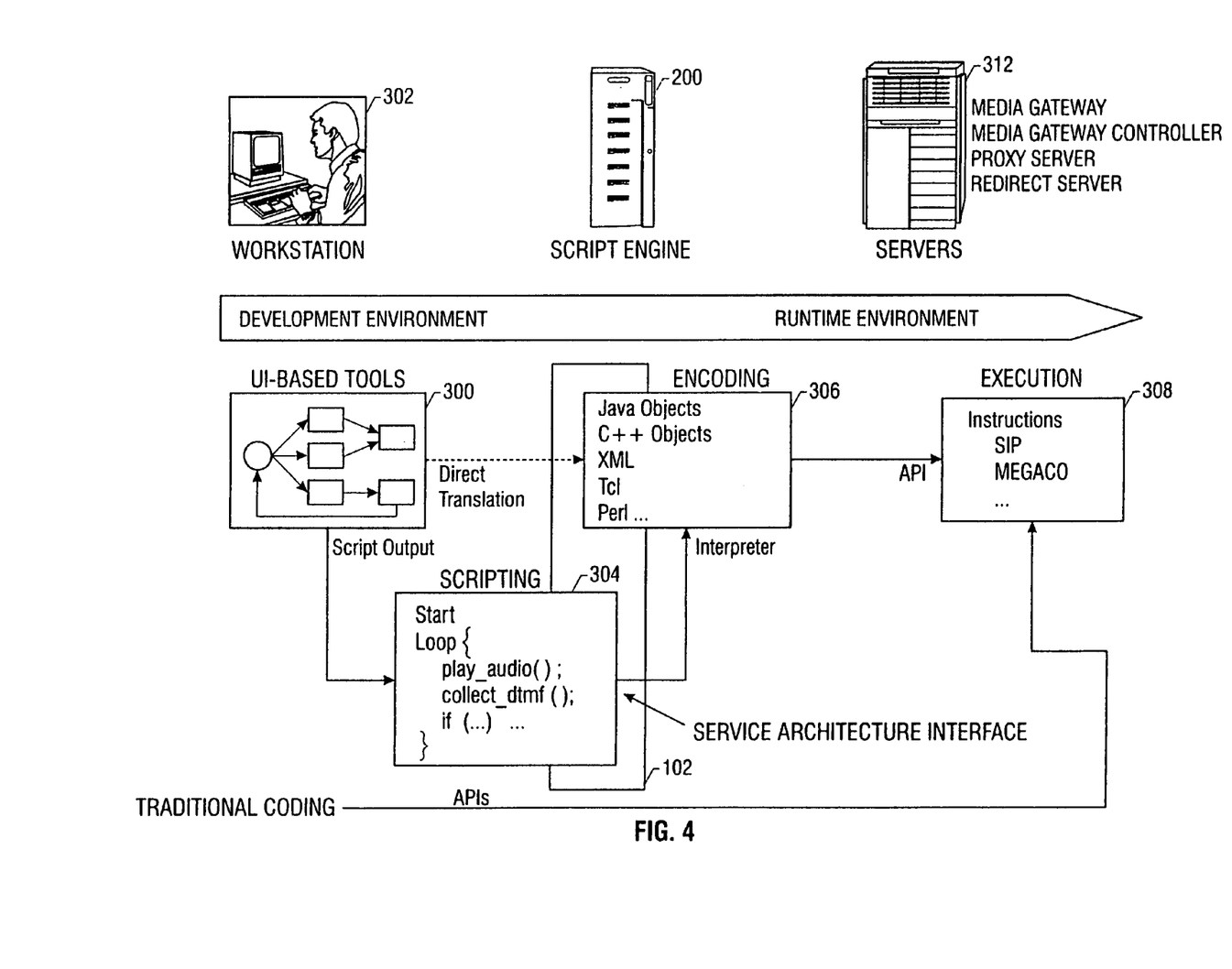
FIG. 4 illustrates a process of creating and executing telephony services in the communications system of FIG. 1 in accordance with an embodiment.

Referring to FIG. 4, the process of creating and executing telephony services in accordance with one embodiment is illustrated. A graphical user interface (GUI) 300 may be provided at a workstation 302 accessible by a user. In the graphical user interface 300, a graphical representation (e.g., in the form of state diagrams) of telephony services or applications may be generated. As an alternative, instead of a graphical user interface, services may be implemented as command lines or in a wizard. The representation of the desired service may then be converted to a script (at 304), such as according to TSL or another scripting language. The graphical representation of telephony services or scripts may be communicated to the translation component 110 of the interface layer 102 (FIG. 2), where they may be interpreted, translated, or compiled as appropriate.

The script may then be interpreted or translated (at 306) to objects, such as Java objects or C++ objects, or other elements such as XML, Tcl, or Perl elements in the interface layer 102. Scripts may be interpreted by a script engine 200 to various objects or elements. A direct translation may also be performed (at 307) from the graphically represented module to one or more objects. Upon execution of the objects or elements in the interface layer 102, instructions, commands, messages, requests, and so forth (generally referred to as "commands") may be generated by the interface 102 and sent to appropriate network elements (at 308) to perform desired telephony services. The commands are generated based on the representations of the network elements by the representation component 114 in the interface layer 102. The commands may be in the form of SIP messages, MEGACO instructions, or other commands. MEGACO is described in IETF Internet Draft entitled "Megaco Protocol," dated in April 2000, and is also referred to as the H.248 protocol promulgated by the ITU.

The SIP messages or MEGACO instructions may be passed through servers 312, such as a media gateway, media gateway controller, proxy server, or redirect server to the other network elements.

Figure 5A:
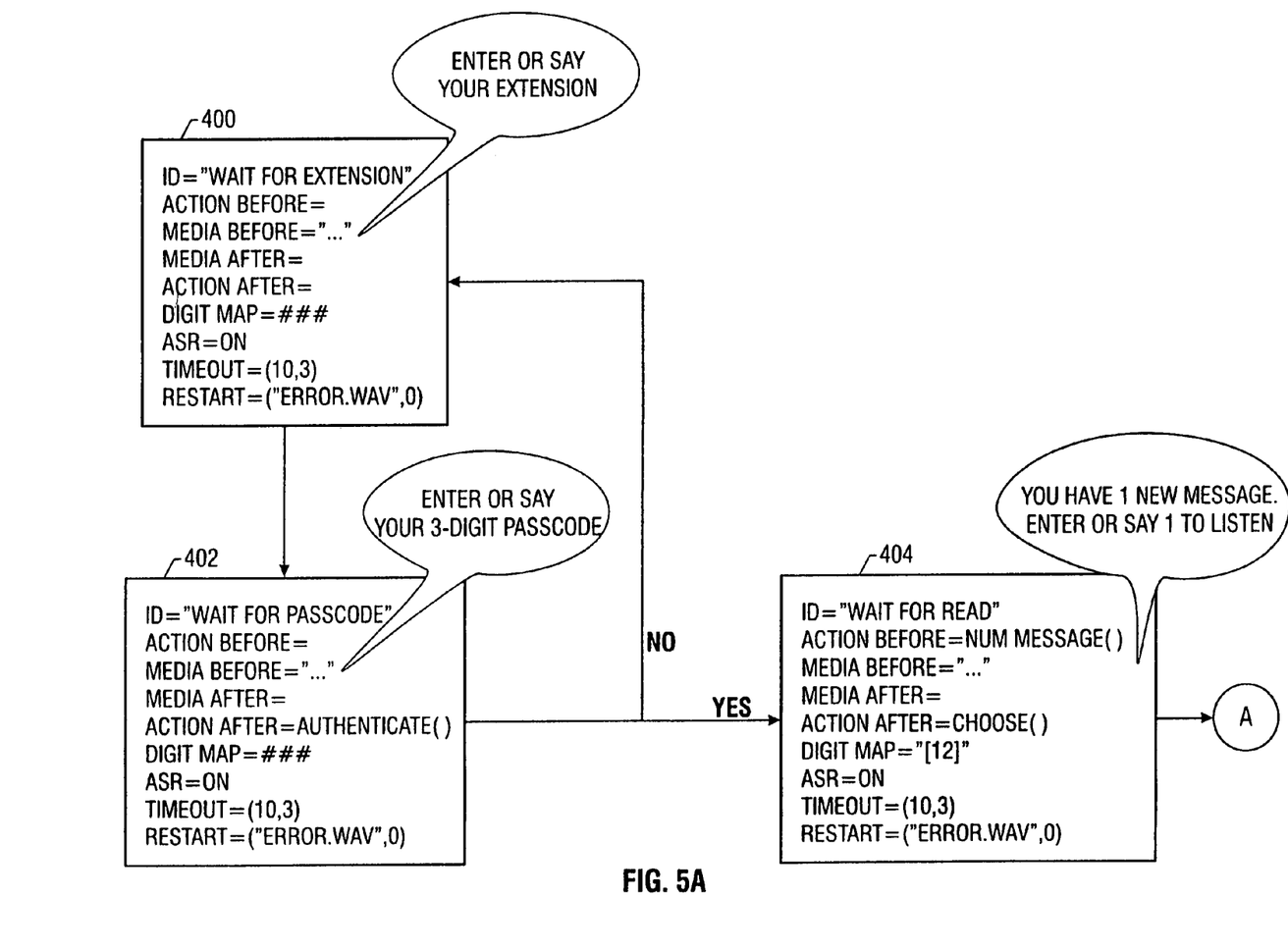
FIGS. 5A-5B are a state diagram of an example embodiment of a software module providing for a voice mail retrieval service.
Figure 5B:
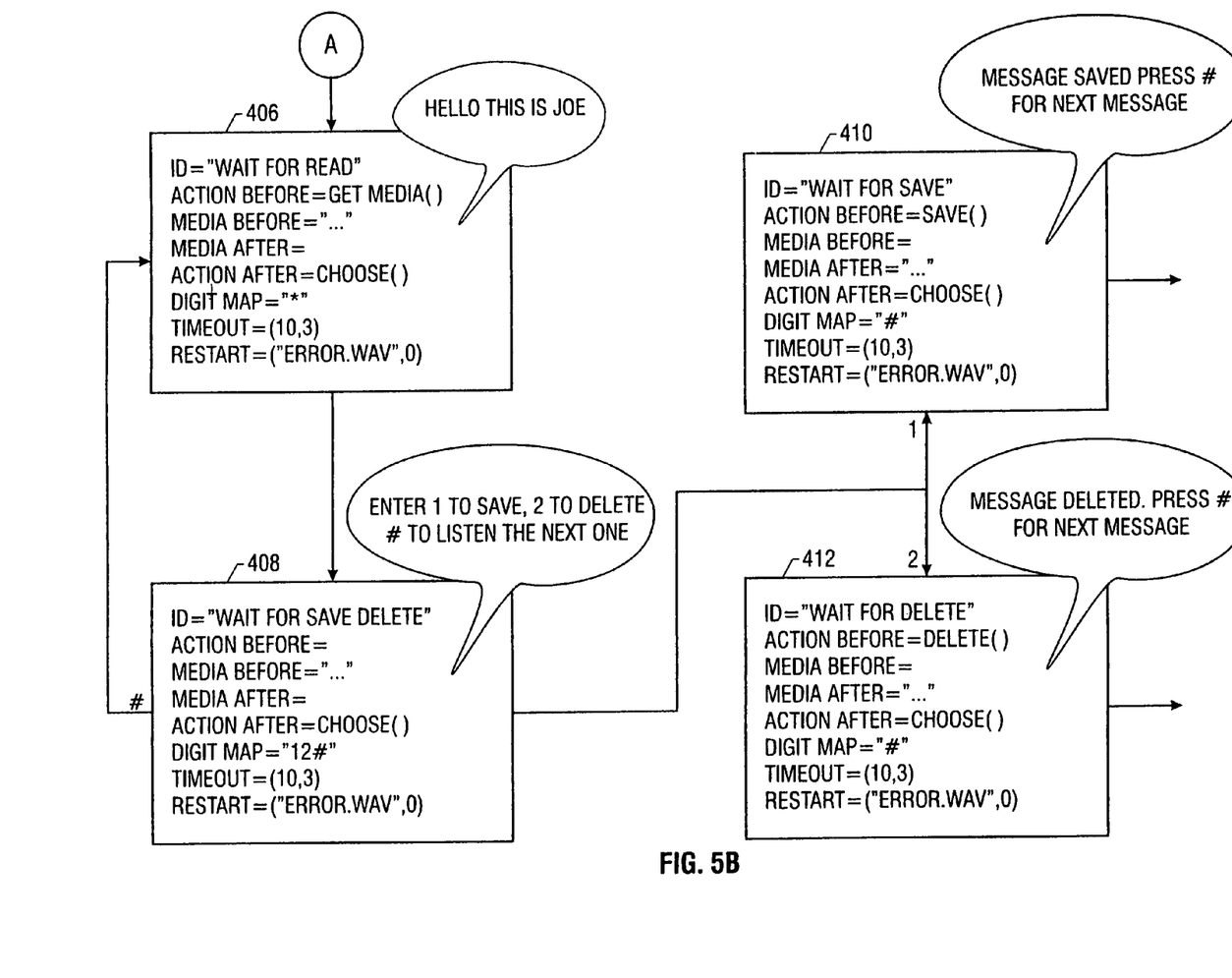

Referring to FIGS. 5A and 5B, an example state diagram of a voice mail message retrieval module is provided, with each state including various properties. The properties in one example embodiment may include the following. A state identifier (ID) may include a unique string to identify a state. An ActionBefore property represents an action to be taken before user input (such as to open a database). A MediaBefore property may represent audio to be played before user input (such as a greeting). A MediaAfter property represents audio to be played after user input but before the next state. An ActionAfter property represents action to be taken after user input but before the next state (e.g., to save a message). A DigitMap property represents acceptable DTMF (dual tone multi-frequency) digits or words. An ASR property enables or disables automatic speech recognition. A Timeouts property represents the maximum time periods to wait before a first input and between inputs. A RestartState property represents the state to return to when some invalid input is given. The default is to repeat the current state. Such state properties are provided as examples only, as different implementations may use different techniques.

As shown in FIG. 5A, the ID of state 400 is "waitForExtension". The MediaBefore property of state 400 may include a string that indicates a greeting "Enter or say your extension." The DigitMap property includes some predetermined DTMF digit or word. ASR is turned on to enable speech recognition (to enable the voice mail system to recognize spoken digits). The Timeouts property includes the maximum number of seconds (e.g., 10) before a first input and the maximum number of seconds (e.g., 3) between inputs. The RestartState property includes the value ("error.wav", 0), where "error.wav" is an audio file containing an error message spoken to the user and 0 represents the default state (e.g., state 900) to transition to upon occurrence of an error.

The module transitions to state 402 upon receiving an extension as user input. State 402, which has an ID of "waitForPasscode," is the state in which the system prompts for and waits for a pass code. The MediaBefore property includes the string "Enter or say your three-digit pass code". The ActionAfter property includes an Authenticate( ) method that is used to authenticate the entered password. If not authenticated, the state machine returns to state 400. If authenticated, the state machine proceeds to state 404, which has an ID of "waitForRead." The ActionBefore property includes the NumMessage( ) method, which determines the number of messages stored at the extension. The MediaBefore property includes the string "You have one new message. Enter or say 1 to listen." The ActionAfter property includes a Choose( ) method that chooses the message to listen based on the user input. The DigitMap property includes a string "12" to accept either a 1 or 2 as the DTMF digit or word.

If either a 1 or 2 is received, the state machine transitions to state 406, which has an "waitForRead". The ActionBefore property includes the GetMedia( ) method, which accesses the storage media used to store the message. The MediaBefore string may include "Hello, this is Joe". The ActionAfter property includes the Choose( ) method, and the DigitMap property includes "*", which represents acceptance of a "*" as a DTMF digit.

If "*" is received, the state machine transitions to the next state 408, which has ID "waitForSaveDelete". The MediaBefore property includes the string "Enter 1 to save, 2 to delete, # to listen to the next one." The ActionAfter property includes the Choose( ) method, and the DigitMap includes the string "#". If "#" is received, then the state machine transitions back to state 406 to choose the next message. If "1" is received, then the message is saved in state 410. If "2" is received, then the message is deleted in state 412.

State 410 has the ID "waitForSave". The ActionBefore property includes the Save( ) method to save the message. The MediaAfter property includes the string "Message saved. Press # for next message." The ActionAfter property includes the Choose( ) method, and the DigitMap property includes the "#" value. If "#" is received in state 410, the state machine proceeds to a state to retrieve the next message.

State 412 has the "waitForDelete" string, and the ActionBefore property includes a Delete( ) method to delete the message. The MediaAfter property includes the message string "Message deleted. Press # for next message", and the ActionAfter property includes Choose( ). The DigitMap property includes the "#" value, which the state machine waits for to proceed further to process the next message.

The module as illustrated in FIGS. 5A-5B contains elements that specify certain telephony services to be performed. In the example, the services are associated with an IVR system. The module is unconcerned with which network elements actually perform a specified service, thus making the task of the software developer much more convenient.

Figure 6:
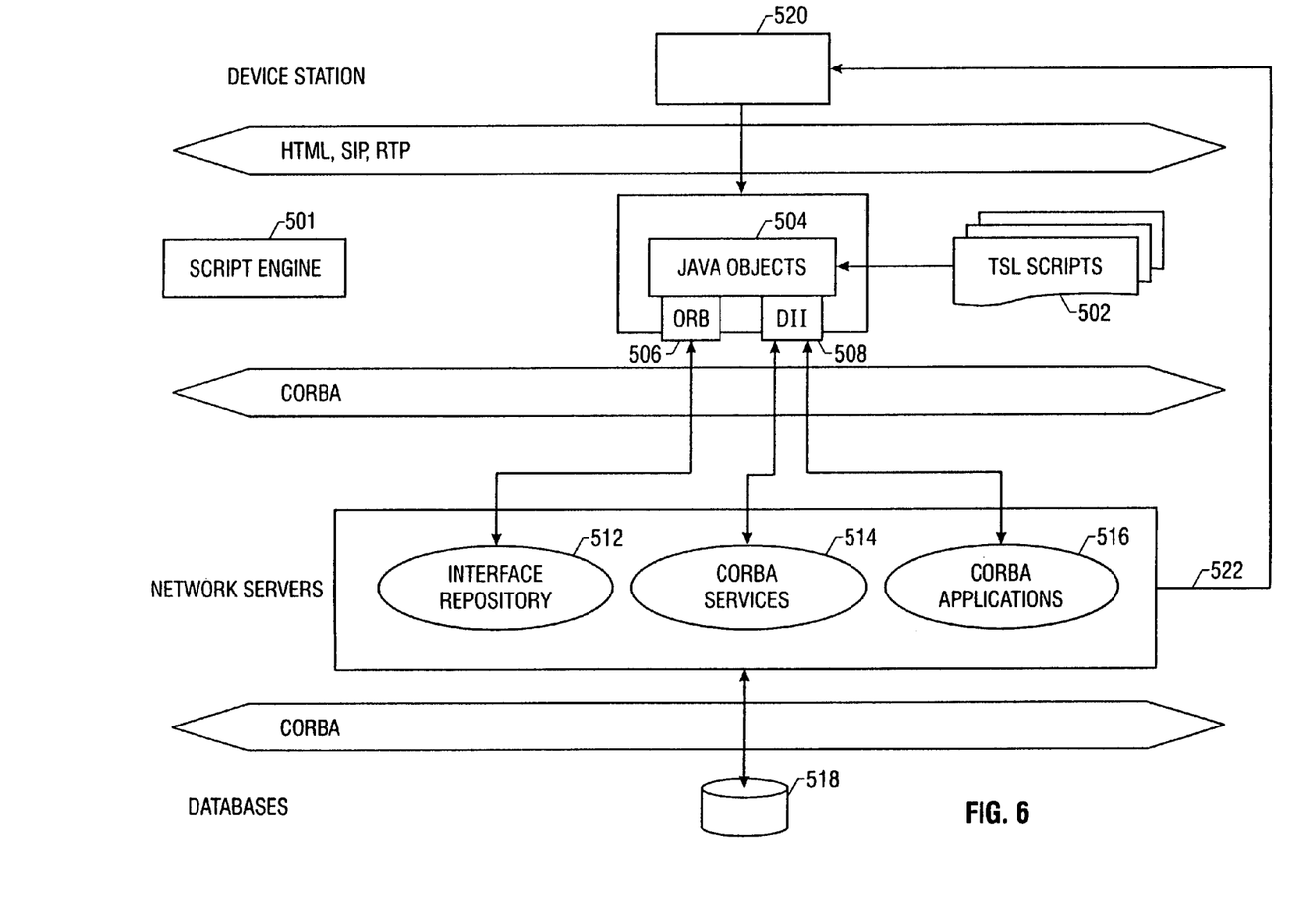
FIG. 6 is a block diagram of another embodiment of a system containing Common Object Request Broker Architecture (CORBA) components and a software module for implementing telephony services.

Referring to FIG. 6, an example system including CORBA components for implementing telephony services is illustrated. Script modules 502 that provide for various telephony services may be written according to TSL. The script modules may be interpreted by a script engine into JAVA objects 504, in one example. The JAVA objects 502 are considered to be client applications that can initiate telephony services on various network elements. The JAVA objects 502 are unaware of the physical locations of the network elements, the protocol (e.g., language of software running in the network element), and other aspects of the network.

To provide the interface between the client objects 504 and the network elements, an object request broker (ORB) 506 and the other CORBA components are implemented in the system. The ORB 506 is a middleware that establishes the client-server relationships between the client applications (JAVA objects 502) and server objects (network elements). Using the ORB 506, each client object 502 can transparently invoke a method on a server object, which can be on the same machine or across a network. The ORB 506 intercepts a method call from a client object 504, finds the appropriate server object, passes appropriate parameters, invokes the method on the server object, and returns results to the client object. THE ORB 506 accesses an interface repository 512 to perform requests.

A dynamic invocation interface (DII) 508 enables a client object 502 to directly access the underlying request mechanisms provided by the ORB 506. Client objects 504 have access to CORBA services 514 and CORBA applications 516 through the DII 508. One or more databases 518 are accessible by the interface repository 512, CORBA services 514, and CORBA applications 516. The elements 512, 514, and 516 may be resident on one or more network servers.

The telephony services implemented by the client objects 504 and CORBA components may be accessible to a device station 520 through various protocols, such as SIP (Session Initiation Protocol), RTP (Real-Time Protocol), or HTML (Hypertext Markup Language).

Figure 7:
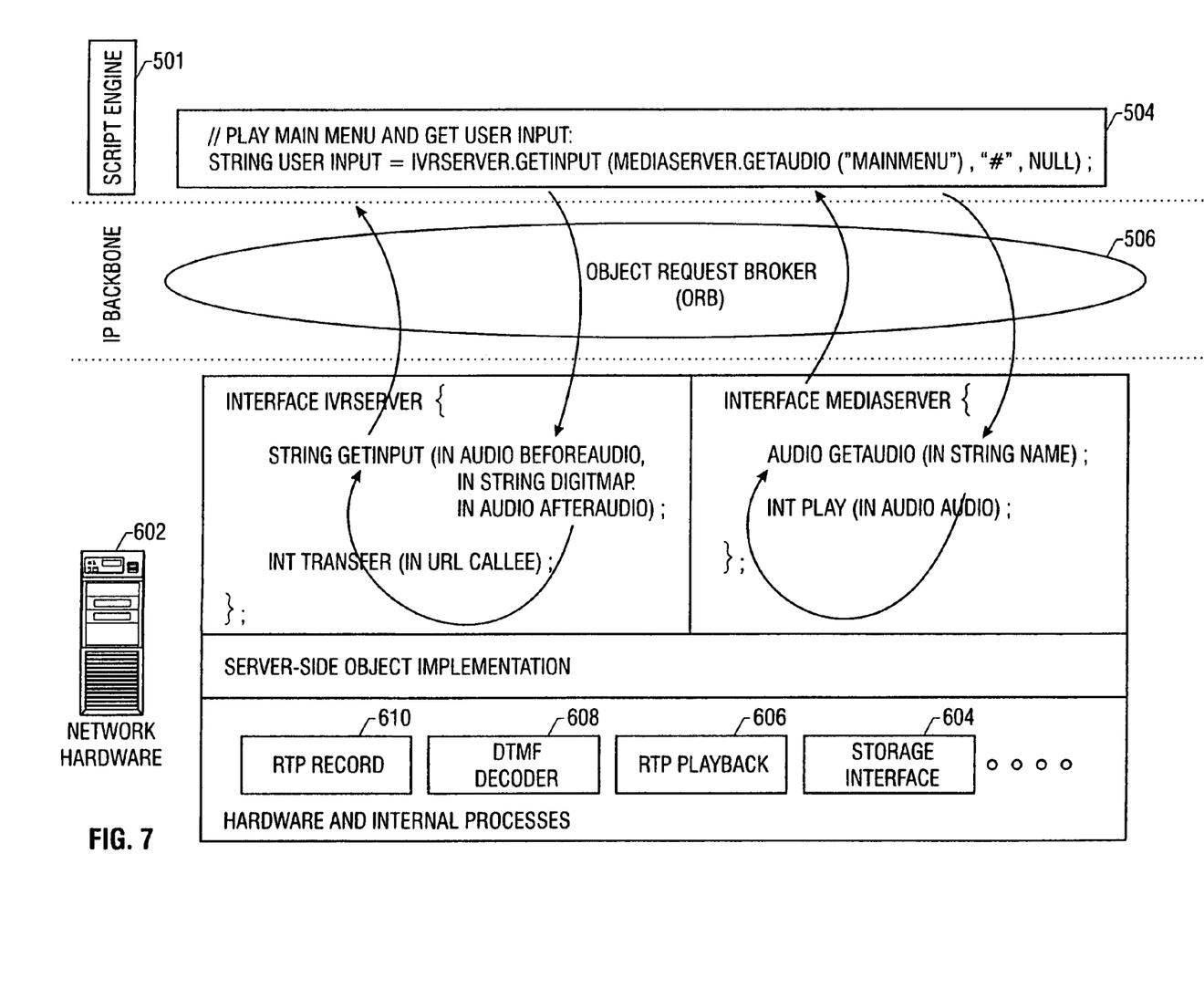
FIG. 7 is a block diagram of an integrated voice response (IVR) system including an Object Request Broker (ORB) according to an example embodiment.

Referring to FIG. 7, an example of how an IVR service can be implemented in the system of FIG. 6 is illustrated. A script module may contain the following line of code for retrieving an input from a caller by an IVR system 602: String UserInput=ivrServer.getInput (mediaServer.getAudio ("mainMenu"), "#", null). The code may be interpreted by the script engine 501 into a client object 504. The client object 504 calls the getAudio method in a media server (mediaServer) implemented in the IVR system. The "mainMenu" parameter is passed to the getAudio method to play the main menu recording, which is retrieved through a storage interface 604 and presented back to the client object 504 as an RTP playback stream by a device 606 (which may be on the same platform as the storage interface 604 or on a different platform).

Another method called by the client object 504 is a getInput method to request user input. Any input entered by user (which is assumed to be a keypad entry) is processed by the DTMF decoder 608, with the tone corresponding to the received digit played back by an RTP record element 610. Further processing may be performed based on the received user input, such as the IVR system transitioning to another menu for further user input or forwarding of the call to an extension.

Thus, a method and apparatus has been described that allows for more convenient and efficient creation of telephony services. An interface layer including translation components, communications components, and representation components is used to cooperate with user-created modules (e.g., scripts or other forms of representations) to perform telephony services. Upon execution of the modules, commands are created and communicated to network elements to perform the telephony services. To facilitate creation of telephony services, representations of network elements may be stored in the interface layer, with such representations accessed to generate appropriate commands to network elements to perform telephony services.

The various software modules, routines, or other layers (represented generally as 708 in FIG. 8) discussed herein may be executed on control units, such as one or more control units 712 in a system 700. The control unit(s) 712 may include a microprocessor, a microcontroller, a processor card (including one or more microprocessors or microcontrollers), or other control or computing devices. The control unit(s) 712 may be coupled to one or more storage units 514, which may include one or more machine-readable storage media for storing data and instructions. The storage media may include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; and optical media such as compact discs (CDs) or digital video discs (DVDs). Instructions that make up the various software routines, modules, or other layers may be stored in respective storage units. The instructions when executed by a respective control unit cause the corresponding node or element to perform programmed acts.

The instructions of the software routines or modules may be loaded or transported into the node or element in one of many different ways. For example, code segments including instructions stored on floppy discs, CD or DVD media, a hard disk, or transported through a network interface card, modem, or other interface device may be loaded into the system and executed as corresponding software routines or modules. In the loading or transport process, data signals that are embodied as carrier waves (transmitted over telephone lines, network lines, wireless links, cables, and the like) may communicate the code segments, including instructions, to the network node or element. Such carrier waves may be in the form of electrical, optical, acoustical, electromagnetic, or other types of signals.

Figure 8:
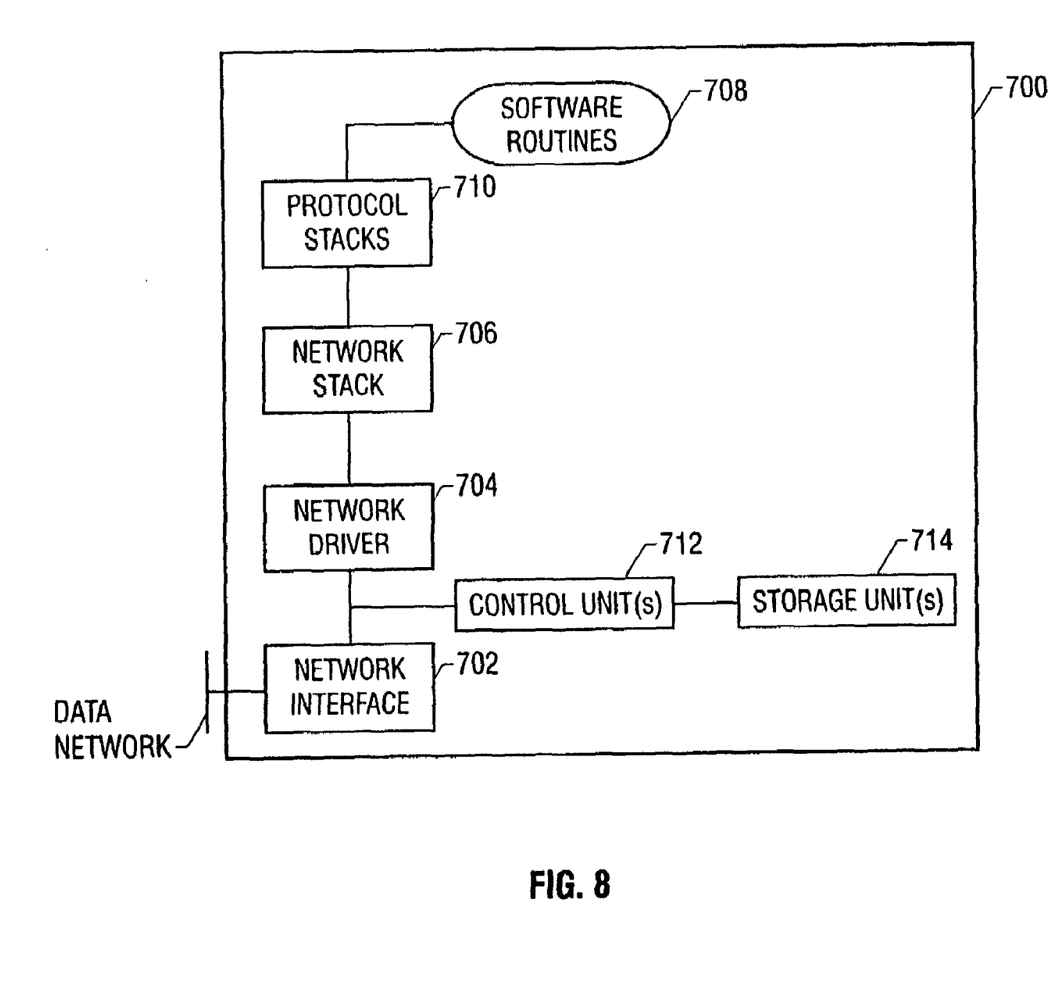
FIG. 8 is a block diagram of components of an example network element in the communications system of FIG. 1.

As shown in FIG. 8, the system 700 also includes a network interface to allow it to communicate over the data network. Above the network interface 702 are a network driver 704, a network stack 706 (e.g., a TCP/IP and/or a UDP/IP stack), and protocol stacks 710 (e.g., a SIP stack, an RTP stack, and so forth).

While the invention has been disclosed with respect to a limited number of embodiments, those skilled in the art will appreciate numerous modifications and variations therefrom. It is intended that the appended claims cover all such modifications and variations as fall within the true spirit and scope of the invention.

What is claimed is:

1. A method for use in a communications network having network elements for performing telephony services, comprising:

providing an interface to the network elements, the interface including representations of the network elements;

receiving requests, by the interface, from a software module specifying performance of telephony services;

sending, in response to requests of the module, commands over a packet-based network to one or more network elements involved in performing the telephony services; and accessing the representations of the network elements to generate the commands.

2. The method of claim 1, wherein receiving requests from the software module comprises receiving requests from script modules.

3. The method of claim 2, wherein providing the interface comprises providing the interface that further includes a script engine to interpret the script modules.

4. The method of claim 2, wherein providing the interface comprises providing the interface that further includes a script engine and an application programming interface, the script engine to interpret the script modules, and the application programming interface enabling communications among the network elements.

5. The method of claim 1, wherein providing the interface comprises providing the interface that further includes a Simple Object Access Protocol component to enable communications among the network elements.

6. The method of claim 1, wherein providing the interface comprises providing the interface that further includes a Common Object Request Broker Architecture component that enables communications among the network elements.

7. The method of claim 1, further comprising representing the software module as a state machine having a plurality of states each representing an action corresponding to a telephony service.

8. The method of claim 1, further comprising the software module receiving user input from which is generated the requests.

9. The method of claim 1, wherein sending the commands comprises sending the commands to one or more network elements selected from the group consisting of an integrated voice response system, a DTMF decoder, a voice mail system, and a recording system.

10. The method of claim 1, wherein sending the commands comprises sending Session Initiation Protocol (SIP) messages.

11. The method of claim 1, wherein sending the commands over the packet-based network comprises sending the commands over an Internet Protocol (IP) network.

12. The method of claim 1, wherein receiving requests specifying performance of telephony services comprises receiving requests specifying performance of telephony services over the packet-based network.

13. The method of claim 1, wherein the representations of the network elements describe details of the network elements.

14. The method of claim 13, further comprising:

translating a script, using a script engine in the interface, into the software module, wherein the script represents the telephony services to be performed.

15. An apparatus for providing telephony services in a communications network having network elements comprising:

a software module containing instructions specifying performance of telephony services in the communications network; and an interface layer comprising representations of the network elements, the interface layer responsive to execution of the software module to generate commands based on the representations of the network elements, and to provide the commands over a packet-based network to corresponding network elements to perform the telephony services specified by the software module.

16. The apparatus of claim 15, wherein the interface layer further comprises a communications component to send the commands to the network elements.

17. The apparatus of claim 16, wherein the communications component comprises an Object Request Broker.

18. The apparatus of claim 16, wherein the communications component comprises an application programming interface.

19. The apparatus of claim 16, wherein the commands include Session Initiation Protocol messages.

20. The apparatus of claim 15, wherein the software module comprises a script.

21. The apparatus of claim 20, wherein the interface layer further comprises a script engine to interpret the script.

22. The apparatus of claim 15, wherein the software module comprises a Java object.

23. The apparatus of claim 15, wherein the interface layer further comprises a Simple Object Access Protocol component to enable communications among the network elements.

24. The apparatus of claim 15, wherein the interface layer further comprises a Common Object Request Broker Architecture component to enable communications among the network elements.

25. The apparatus of claim 15, wherein the representations of the network elements comprise representations of one or more of the following network elements: an integrated voice response system, a DTMF decoder, a voice mail system, and a recording system.

26. The apparatus of claim 15, wherein the packet-based network comprises an Internet Protocol (IP) network.

27. The apparatus of claim 15, wherein the software module contains instructions specifying performance of telephony services over an Internet Protocol (IP) network.

28. The apparatus of claim 15, wherein the representations of the network elements describe details of the network elements.

29. The apparatus of claim 28, wherein the interface layer further includes a script engine to translate a script into the software module, wherein the script represents the telephony services to be performed.

30. A system for use in a telephony network having network elements capable of performing various telephony services, comprising:
    means for storing representations of telephony services;
    interface means for communicating with the network elements, wherein the interface means further includes representations of the network elements; and
    means for executing the storing means to specify performance of a telephony service, the interface means generating, in response to execution of the storing means, commands by accessing the representations of the network elements, and sending the commands over a packet-based network to the one or more network elements involved in performing the telephony service.

31. The system of claim 30, wherein the packet-based network comprises an Internet Protocol (IP) network, and the storing means stores representations of telephony services over the IP network.

32. An article including one or more machine-readable storage media containing instructions for providing telephony services in a communications network, the instructions when executed causing a controller to:
    receive requests from a telephony service software module specifying plural telephony tasks;
    in response to the requests, access representations of the network elements to produce commands, the representations of the network elements contained in an interface layer; and
    send the commands, from the interface layer, over a packet-based network to one or more of the network elements in the communications network in response to the requests to perform the specified telephony tasks.

33. The article of claim 32, wherein the instructions when executed cause the controller to send commands according to a Command Object Request Broker Architecture protocol.

34. The article of claim 32, wherein the instructions when executed cause the controller to perform one or more of the tasks selected from the group consisting of play recording, receive dual tone multi-frequency signals, receive voice data, access voice mail, and forward a call.

35. The article of claim 32, wherein sending commands over the packet-based network comprises sending commands over an Internet Protocol (IP) network.

36. The article of claim 35, wherein receiving requests from the telephony service software module specifying plural telephony tasks comprises receiving requests from the telephony service software module specifying plural telephony tasks over the IP network.

37. The article of claim 32, wherein sending the commands comprises sending the commands to one or more of the following network elements: an integrated voice response system, a DTMF decoder, a voice mail system, and a recording system.

* * * * *